2,977,253
Patented Mar. 28, 1961

United States Patent Office

2,977,253
PROCESS FOR THE PURIFICATION OF SUGAR-CONTAINING JUICES

Albert René Grandadam, Saint-Maur, France, assignor to Societe Industrielle et Agricole de la Somme et Raffinerie François, Paris, France, a corporation of France No Drawing. Filed Mar. 12, 1958, Ser. No. 720,832
Claims priority, application France Mar. 14, 1957
7 Claims. (Cl. 127—50)

The present invention relates to the purification of sugar-containing juices such as those obtained by techniques of diffusion or pressure applied to sugar-containing plants such as sugar-beet and sugar-cane.

One knows that diffused or pressed juices must be treated to remove colloids, that is to say different impurities, constituted in the main by pectin and protein materials; this constitutes the purification. Numerous processes have been proposed for this purpose. The most used process in the refining of beet sugar consists in carrying out a pre-liming of the juices which come from the diffusion battery at a pH of the order of 6 and at about 40° C. in order to bring their pH to the optimum value for flocculation of the impurities (about pH 11). The juices are then heated to 80–85° C., treated with lime again and then carbonated, the precipitation of calcium carbonate ensuring the entrainment of the impurities which are precipitated in colloidal form. One then filters the juice so treated and carries out a second carbonation in order to reduce the content of calcium salts to the minimum.

This process and its numerous variants which have been proposed give rise to a number of disadvantages:

The filtering of the colloids is difficult such that it is not practically possible to carry out the process continuously with a rotary filter;

The quantity of lime used is much greater than that actually required to precipitate the impurities by reason of the fact that a large excess of calcium carbonate must be present to obtain a better filtration;

The purification requires much time and the consumption of an important material.

The invention proposes to remedy these disadvantages and to produce an improved process for the purification of sugar-containing juices.

This process is characterized in that it comprises treating the juices obtained by diffusion or pressing in the presence of sulfite ions by the controlled simultaneous and continuous addition of lime and carbon dioxide so as to bring these juices by a continuous means to the optimum pH for flocculation of about 11.

It has been discovered that this process, which conveniently replaces the normal pre-liming or at the same time the pre-liming, the liming and the first carbonation, ensures excellent filtration, requiring only a small quantity of lime. Whilst it is not intended to limit the invention by theoretical considerations it would appear that the improvements noted are due to the following considerations.

The simultaneous and continuous addition of lime and carbon dioxide in the presence of sulfite ions ensures the formation of calcium sulfite and calcium carbonate at the same time as the progressive flocculation of the impurities as the pH rises. Now calcium carbonate if it forms large particles precipitates slowly whilst calcium sulfite which is very fine and very heavy precipitates rapidly. In this way the calcium carbonate absorbs immediately a greater part of the flocculate obtained by the action of the lime on the impurities and the precipitation is accelerated by the particles of calcium sulfite. The advantage resides thus in a simultaneous flocculation and precipitation of impurities which ensures stabilization of the precipitate.

The presence of sulfite ions in the juices at the moment of adding the lime and carbon dioxide can be obtained by the prior addition of sulfur dioxide gas or of sulfite in the diffusion batteries themselves. In one modification this gas or the sulfite can be added at the same time as the lime and the carbon dioxide.

It will be noted that the sulfur dioxide or the sulfite, besides favoring rapid precipitation of the colloids, at the same time causes decolorization of the juice.

The quantity of sulfur dioxide present in the juice at the moment of adding the lime and the carbon dioxide is advantageously between 2 and 30 grams per hectolitre of juice. The quantity of lime introduced can vary between 200 and 1,000 grams per hectolitre, the quantity of carbon dioxide being that necessary to obtain progressive development of the pH to about 11, taking account of the simultaneous addition of lime and the presence of sulfite ions. The ranges given for the lime are those which take account of the two possibilities offered by the present process, that is to say:

Its substitution for pre-liming alone, or its substitution for pre-liming, liming and the first carbonation. In fact, in the first case, one would be led in the present process to the lower values of the range mentioned, for example, between 200 and 600 grams of lime per hectolitre of juice, the residual lime being added during the corresponding liming. In the second case, on the other hand, it is advantageous to use 600 to 1,000 grams per hectolitre.

In either case, the total quantity of lime is not greater than 1,000 grams per hectolitre, which represents some two-thirds of the usual consumption of this reagent used in the prior processes.

In addition, if one takes account of the time saved in the filtration and the possibility of carrying this out continuously one will see the total effect of the advantages of the present process. It will also be noted that the purification can be carried out continuously. In this case, the diffused juice will be admitted continuously to the liming-carbonation stage in the presence of sulfite ions. There will now be given by way of explanation only a detailed description of the purification of sugar-containing juices according to the invention by the above-mentioned two variants.

(1) Sulfite treatment, liming and carbonation replacing only the classical pre-liming.

The steps of the purification are as follows:

(a) Treatment of the diffused juices with lime and carbon dioxide introduced simultaneously and in continuous manner to ensure continuous development of the pH to 11 in the presence of sulfite ions added in the diffusion battery or at the same time as the lime and carbon dioxide.

(b) Re-heating of the juices to 80–85° C.

(c) Corresponding liming of the juices.

(d) Corresponding carbonation of the juices.

The steps (c) and (d) may be effected successively or simultaneously.

(e) Filtration.

(f) Second carbonation.

(g) Filtration.

(2) Sulfite treatment, liming and carbonation replacing pre-liming and the first carbonation.

The succession of the steps is thus as follows: (a)—(b)—(e)—(f)—(g), which represents a very important simplification. To this one should add that as a result of the ease with which the juice can be filtered, the step (a) can be readily carried out on a rotary filter. Filtration can be proceeded by a weak carbonation to effect a slight lowering of the pH and separation of sediment from the clear liquid either by decantation or by centrifugation or by a combination of these two means.

In the two variants mentioned, one can further improve the precipitation of the colloids by adding at step (a) a small quantity of calcium carbonate which serves to initiate the crystallization of the calcium carbonate formed in situ. To this end the juices coming from the diffusion battery are introduced and progressively mixed into a purified sugar-containing juice containing calcium carbonate formed in another step of the process (juice from the second carbonation for example).

It will be understood that the invention is not limited to the specific methods of operation above described which are given by way of example only.

I claim:

1. A process for the purification of sugar-containing juices, comprising alkalizing a batch of raw juices extracted from diffusion by a continuous and simultaneous addition of: lime, at a constant flow rate, for the flocculation of the impurities contained in the juices, carbon dioxide, at a variable flow rate, to produce a precipitate of calcium carbonate adsorbing the flocculated impurities, and sulphur dioxide, at a constant flow rate, to promote said precipitation, the last mentioned flow rate being substantially lower than the lime flow rate, and the carbon dioxide flow rate being controlled so that the pH of the mixture gradually increases from the pH value of the raw juices to a value corresponding to optimum filtrability.

2. A process for the purification of sugar-containing juices, comprising alkalizing a batch of raw juices extracted from diffusion by a continuous and simultaneous addition of: lime, at a constant flow rate, in an amount ranging from 300 to 600 g. per 100 l. of juices, carbon dioxide at a variable flow rate, and sulphur dioxide at a constant flow rate in an amount ranging from 4 to 20 g. per 100 l. of juices, the two last mentioned reagents being effective to precipitate the impurities of the juices flocculated by the lime, and the flow of carbon dioxide being controlled so that the pH of the mixture gradually increases from the pH value of about 6 for the raw juices to a value of about 11 corresponding to optimum filtrability.

3. A process for the purification of sugar-containing juices, comprising alkalizing a batch of raw juices extracted from diffusion by a continuous and simultaneous addition of: lime, at a constant flow rate, for the flocculation of the impurities contained in the juices, carbon dioxide at a variable flow rate, and sulphur dioxide at a constant flow rate, the last mentioned flow rate being appreciably lower than the flow rate of the lime, whereby precipitation of calcium carbonate and calcium sulfite having a high adsorption capacity for said flocculated impurities occurs, controlling the carbon dioxide flow rate so that the pH value of the mixture gradually increases from the pH value of the raw juices to a value corresponding to optimum filtrability, collecting said precipitates of calcium carbonate and calcium sulfite with adsorbed impurities, filtrating the mixture to obtain a clear juice containing soluble lime, adding to said clear juice a further amount of lime, adding carbon dioxide to said clear juice to precipitate calcium carbonate, and recycling said precipitate in raw juices extracted from diffusion, thereby initiating the formation, during said alkalizing, of said precipitate of calcium carbonate having adsorption capacity, and determining the growth of the crystals of calcium carbonate to increase their adsorption capacity.

4. A process for the purification of sugar-containing juices, comprising alkalizing a batch of raw juices extracted from diffusion by a continuous and simultaneous addition of: lime, at a constant flow rate, for the flocculation of the impurities contained in the juices, carbon dioxide, at a variable flow rate to produce a precipitate of calcium carbonate adsorbing the flocculated impurities, and sulphur dioxide at a constant flow rate, to promote said precipitation, the last mentioned flow rate being controlled to maintain the pH of the mixture substantially unaffected, and the carbon dioxide flow rate being controlled so that the pH of the mixture gradually increases from the pH value of the raw juices to a value corresponding to optimum filtrability.

5. A process for the purification of sugar-containing juices comprising adding to a batch of raw juices extracted from diffusion a suspension of calcium carbonate to provide crystallization seeds in said juices and alkalizing said batch by adding, continuously and simultaneously: lime, at a constant flow rate, for the flocculation of the impurities contained in the juices, carbon dioxide, at a variable flow rate, to produce a precipitate of calcium carbonate adsorbing the flocculated impurities, and sulphur dioxide, at a constant flow rate, to promote said precipitation, the last mentioned flow rate being substantially lower than the lime flow rate, and the carbon dioxide flow rate being controlled so that the pH of the mixture gradually increases from the pH value of the raw juices to a value corresponding to optimum filtrability.

6. A process for the purification of sugar-containing juices comprising continuously feeding the raw juices extracted from diffusion to a treatment zone and introducing simultaneously in said zone, at each of a plurality of equally spaced points along said zone, lime at a constant flow rate, to flocculate the impurities contained in said juices, carbon dioxide at a variable flow rate to produce a precipitate of calcium carbonate adsorbing the flocculated impurities, and sulphur dioxide at a constant flow rate to promote said precipitation, the last mentioned flow rate being substantially lower than the flow rate of lime, and the flow rate of carbon dioxide being controlled so that the pH of the juices gradually increases from the inlet to the outlet of said zone between the pH value of the raw juices and the value corresponding to optimum filtrability.

7. A process for the purification of sugar-containing juices comprising alkalizing a batch of raw juices extracted from diffusion by continuous and simultaneous addition of lime at a constant flow rate for the flocculation of the impurities contained in the juices, carbon dioxide, at a variable flow rate to produce a precipitate of calcium carbonate adsorbing the flocculated impurities, and sulphur dioxide at a constant flow rate to promote said precipitation, the last mentioned flow rate being substantially lower than the lime flow rate, and the carbon dioxide flow rate being controlled so that the alkalinity of the mixture measured by the amount of lime dissolved in the juices gradually increases from the negative value of the raw juices to a value ranging from 0.8 to 1.2 g. per l. of juices.

References Cited in the file of this patent

UNITED STATES PATENTS

| 1,018,994 | Stewart | Feb. 27, 1912 |
| 1,897,424 | Foster | Feb. 14, 1933 |
| 1,954,566 | Foster | Apr. 10, 1934 |
| 1,988,923 | Teatini | Jan. 23, 1935 |
| 2,067,362 | Von Stietz | Jan. 12, 1937 |
| 2,071,776 | Teatini | Feb. 23, 1937 |
| 2,184,570 | Teatini | Dec. 26, 1939 |
| 2,697,049 | Muller | Dec. 14, 1954 |

OTHER REFERENCES

Sugar, art. by Waterman, December 1953, pp. 51–52.
Principles of Sugar Techn., by Honig, Elsevier Pub. Co., 1953, pp. 584–596.
Sugar, art. by Saha, August 1951, pp. 32–35.
Sugar, art. by Saha, January 1955, pp. 37–39.